US010855129B1

(12) United States Patent
 Lenius et al.

(10) Patent No.: US 10,855,129 B1
(45) Date of Patent: *Dec. 1, 2020

(54) PRINTED CIRCUIT BOARD LAYOUT

(71) Applicant: Waymo LLC, Mountain View, CA (US)

(72) Inventors: Samuel William Lenius, Sunnyvale, CA (US); Paul Karplus, Sunnyvale, CA (US); Alexander Danilo Zbrozek, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 15/827,762

(22) Filed: Nov. 30, 2017

Related U.S. Application Data

(63) Continuation of application No. 14/568,479, filed on Dec. 12, 2014, now Pat. No. 9,935,514.

(60) Provisional application No. 62/012,295, filed on Jun. 14, 2014.

(51) Int. Cl.
 *H02K 3/26* (2006.01)
 *G01S 17/02* (2020.01)
 *G01S 7/481* (2006.01)

(52) U.S. Cl.
 CPC .............. *H02K 3/26* (2013.01); *G01S 7/4817* (2013.01); *G01S 17/02* (2013.01)

(58) Field of Classification Search
 None
 See application file for complete search history.

(56) References Cited

U.S. PATENT DOCUMENTS

| 3,480,815 | A | * | 11/1969 | Knapp | ...................... H02K 3/26 |
| | | | | | 310/268 |
| 5,982,074 | A | | 11/1999 | Smith et al. | |
| 8,558,425 | B2 | | 10/2013 | Stahlhut et al. | |
| 8,736,133 | B1 | | 5/2014 | Smith et al. | |
| 2002/0171324 | A1 | * | 11/2002 | Smith | ...................... H02K 3/26 |
| | | | | | 310/268 |

(Continued)

OTHER PUBLICATIONS

Boulder Wind Power Advanced Drivetrain U.S. DOE Wind and Water Power Program Next Generation Drivetrain Development Program, Boulder Wind Power, dated Aug. 31, 2012.

(Continued)

*Primary Examiner* — Isam A Alsomiri
*Assistant Examiner* — Amir J Askarian
(74) *Attorney, Agent, or Firm* — McDonnell Boehnen Hulbert & Berghoff LLP

(57) ABSTRACT

A printed circuit board (PCB) includes a first plurality of conductive paths having first ends at an inner radius of the PCB and second ends at an outer radius of the PCB. The PCB further includes a second plurality of conductive paths having first ends at an outer radius of the PCB and second ends at an inner radius of the PCB. The PCB further includes a first plurality of conductive vias that pass through the PCB at the outer radius of the PCB and couple second ends of the first plurality of conductive paths to first ends of the second plurality of conductive paths. The PCB further includes a second plurality of conductive vias that pass through the PCB at the inner radius of the PCB and electrically couple second ends of the second plurality of conductive paths to first ends of the first plurality of conductive paths.

20 Claims, 6 Drawing Sheets

(56) References Cited

U.S. PATENT DOCUMENTS

| | | | | |
|---|---|---|---|---|
| 2008/0042515 A1* | 2/2008 | Butterfield | ............... | H02K 3/26 |
| | | | | 310/268 |
| 2011/0273048 A1 | 11/2011 | Jore et al. | | |
| 2015/0185313 A1* | 7/2015 | Zhu | ......................... | G01S 17/08 |
| | | | | 356/5.01 |
| 2016/0164358 A1* | 6/2016 | Dehez | ...................... | H02K 3/28 |
| | | | | 310/208 |

OTHER PUBLICATIONS

Das, S., et al., "Multi-Watt Electric Power from a Microfabricated Permanent-Magnet Generator," Presented at the 18th IEEE Int. Conf. on Micro Electro Mechanical Systems (MEMS 2005), Miami Beach, FL, Jan. 2005, 4 pages.

\* cited by examiner

PRINTED CIRCUIT BOARD LAYOUT

CROSS REFERENCE TO RELATED APPLICATIONS

This continuation application claims priority to U.S. patent application Ser. No. 14/568,479 which was filed on Dec. 12, 2014. U.S. patent application Ser. No. 14/568,479 claims priority to U.S. Provisional Patent Application No. 62/012,295 which was filed on Jun. 14, 2014. The contents of both applications are incorporated herein in their entirety.

BACKGROUND

Unless otherwise indicated herein, the materials described in this section are not prior art to the claims in this application and are not admitted to be prior art by inclusion in this section.

Printed circuit boards may include one or more conductive layers separated by one or more insulating layers that form a circuit. Many types of circuits can be formed using printed circuit boards.

SUMMARY

In one example, a printed circuit board (PCB) of a multi-phase brushless motor is provided. The PCB includes a first conductive layer comprising a first plurality of conductive paths respectively having a first end at an inner radius of the PCB and a second end at an outer radius of the PCB. The PCB further includes a second conductive layer comprising a second plurality of conductive paths respectively having a first end at an outer radius of the PCB and a second end at an inner radius of the PCB. The PCB further includes a first plurality of conductive vias that pass through the PCB at the outer radius of the PCB and respectively electrically couple second ends of the first plurality of conductive paths to first ends of the second plurality of conductive paths. The PCB further includes a second plurality of conductive vias that pass through the PCB at the inner radius of the PCB and respectively electrically couple second ends of the second plurality of conductive paths to first ends of the first plurality of conductive paths. The PCB further includes a positive terminal configured to be electrically coupled to a power supply and a composite path comprising a conductive path of the first plurality of conductive paths and a conductive path of the second plurality of conductive paths. The composite path makes at least one substantially complete revolution around a circumference of the PCB. The PCB further includes a first conductive path extending radially outward of the outer radius of the PCB that electrically couples the positive terminal of the PCB to the composite path and a negative terminal configured to be electrically coupled to the power supply. The PCB further includes a second conductive path extending radially outward of the outer radius of the PCB that electrically couples the negative terminal of the PCB to the composite path.

In another example, a vehicle is provided that includes a scanner of a Light Detection and Ranging (LIDAR) system. The scanner is configured to direct, over a range of directions, a light beam generated by the LIDAR system. The vehicle further includes a printed circuit board (PCB) of a multi-phase brushless motor coupled to the scanner. The multi-phase brushless motor is configured to rotate the scanner thereby changing the direction of the light beam. The PCB includes a first conductive layer comprising a first plurality of conductive paths respectively having a first end at an inner radius of the PCB and a second end at an outer radius of the PCB. The PCB further includes a second conductive layer comprising a second plurality of conductive paths respectively having a first end at an outer radius of the PCB and a second end at an inner radius of the PCB. The PCB further includes a first plurality of conductive vias that pass through the PCB at the outer radius of the PCB and respectively electrically couple second ends of the first plurality of conductive paths to first ends of the second plurality of conductive paths. The PCB further includes a second plurality of conductive vias that pass through the PCB at the inner radius of the PCB and respectively electrically couple second ends of the second plurality of conductive paths to first ends of the first plurality of conductive paths. The PCB further includes a positive terminal configured to be electrically coupled to a power supply and a composite path comprising a conductive path of the first plurality of conductive paths and a conductive path of the second plurality of conductive paths. The composite path makes at least one substantially complete revolution around a circumference of the PCB. The PCB further includes a first conductive path extending radially outward of the outer radius of the PCB that electrically couples the positive terminal of the PCB to the composite path and a negative terminal configured to be electrically coupled to the power supply. The PCB further includes a second conductive path extending radially outward of the outer radius of the PCB that electrically couples the negative terminal of the PCB to the composite path.

In yet another example, a printed circuit board (PCB) is provided that includes a positive terminal configured to be electrically coupled to a positive terminal of a power supply and a first conductive path electrically coupled to the positive terminal of the PCB. The first conductive path makes at least one substantially complete revolution around a circumference of the PCB. The PCB further includes a first conductive via and a second conductive path electrically coupled to the first conductive path by the first conductive via. The second conductive path makes at least one substantially complete revolution around a circumference of the PCB. The PCB further includes a second conductive via and a third conductive path electrically coupled to the second conductive path by the second conductive via. The third conductive path makes at least one substantially complete revolution around a circumference of the PCB. The PCB further includes a negative terminal electrically coupled to the third conductive path. The negative terminal is configured to be coupled to a negative terminal of the power supply.

These as well as other aspects, advantages, and alternatives, will become apparent to those of ordinary skill in the art by reading the following detailed description, with reference where appropriate to the accompanying figures.

DETAILED DESCRIPTION

Figure 1:
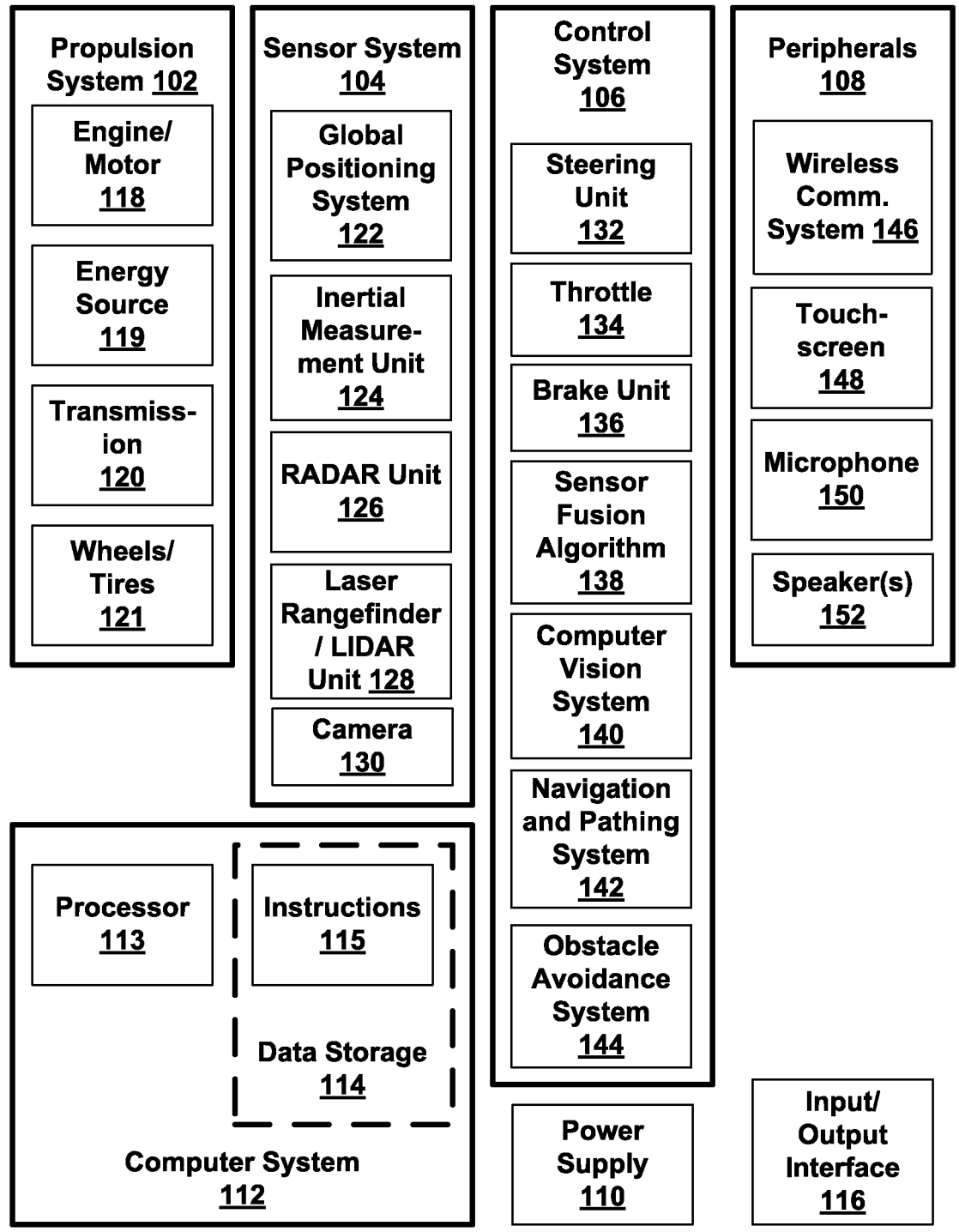
FIG. 1 is a functional block diagram illustrating a vehicle, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a printed circuit board (PCB) may be configured to be a stator of a brushless axial-flux motor. The PCB may be connected to a multi-phase power supply such that current flows through various conductive paths of the PCB to cause one or more rotors of the motor to rotate beside the PCB stator.

The PCB may include a first conductive layer and a second conductive layer separated by an insulating layer. The insulating layer may electrically insulate portions of the first conductive layer from portions of the second conductive layer. A first plurality of conductive vias may electrically couple portions of the first conductive layer to portions of the second conductive layer at an outer radius of the PCB while a second plurality of conductive vias may electrically couple portions of the first conductive layer to portions of the second conductive layer at an inner radius of the PCB.

The first and second conductive layers may each be patterned to form a series of conductive paths for current provided by the power source. For example, the conductive paths may be configured to function as current paths for respective phase currents. Further, conductive paths of the first and second conductive layers may be electrically coupled by conductive vias at the inner radius of the PCB and the outer radius of the PCB to form current paths that alternate between the first and second conductive layers. For example, current could flow from the inner radius of the PCB, through a conductive path of the first conductive layer, through a conductive via on the outer radius of the PCB, through a conductive path of the second conductive layer, through a conductive via on the inner radius of the PCB, through another conductive path of the first conductive layer, through another conductive via on the outer radius of the PCB, and so on.

In one example, the brushless axial-flux motor may rotate a laser scanner (e.g., a scanning head) of a Light Detection and Ranging (LIDAR) system of the vehicle. For instance, the brushless axial-flux motor may be mechanically coupled to a shaft that is further mechanically coupled to a reflector (e.g., a mirror). A laser may illuminate the reflector with a light beam, and the brushless axial-flux motor may rotate the reflector to redirect the light beam in various directions for remote sensing purposes. For example, as the brushless axial-flux motor makes a full 360-degree rotation, the laser scanner may similarly redirect or scan the light beam about 360-degrees of rotation.

In another example, the brushless axial-flux motor may rotate one or more wipers of a sensor unit of the vehicle. The sensor unit may house one or more of the vehicle's sensors, such as LIDAR, camera(s), etc. For instance, the sensor unit may be mounted on a top exterior surface of the vehicle and be enclosed within an at least partially transparent casing (e.g., a plastic casing). During operation of the vehicle, an exterior surface of the casing may become coated with mud, dust, or similar opaque contaminants. The brushless axial-flux motor may be mechanically coupled to the one or more wipers, and cause the one or more wipers to move across the exterior surface of the casing, thereby removing the contaminants from at least a portion of the transparent casing. Removing the contaminants in such a manner may allow light-sensitive sensors such as LIDAR or cameras to detect and/or transmit light through the casing.

Referring now to the figures, FIG. 1 is a functional block diagram illustrating a vehicle 100, according to an example embodiment. The vehicle 100 could be configured to operate fully or partially in an autonomous mode. For example, the vehicle 100 could be self-controlling while in the autonomous mode, and may be configured to determine a current state of the vehicle 100, determine an environment of the vehicle 100, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, and an input/output interface 116. The vehicle 100 may include more or fewer subsystems and each subsystem could include multiple elements. Further, each of the subsystems and elements of the vehicle 100 could be interconnected. Thus, one or more of the described functions of the vehicle 100 may be divided into additional functional or physical components, or combined into fewer functional or physical components. In some further examples, additional functional and/or physical components may be added to the examples illustrated by FIG. 1.

The propulsion system 102 may include components configured to provide motion for the vehicle 100. In an example embodiment, the propulsion system 102 could include an engine/motor 118, an energy source 119, a transmission 120, and wheels/tires 121. The engine/motor 118 could be any combination of an internal combustion engine, an electric motor, a steam engine, a Stirling engine, or other types of engines and/or motors. In some embodiments, the engine/motor 118 may be configured to convert the energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are configured to transmit mechanical power from the engine/motor 118 to the wheels/tires 121. To this end, the transmission 120 could include a gearbox, a clutch, a differential, and drive shafts. The transmission 120 could include other elements. The drive shafts could include one or more axles that could be coupled to the one or more wheels/tires 121.

The wheels/tires 121 of vehicle 100 could be configured in various formats, including a unicycle, a bicycle/motorcycle, a tricycle, or a car/truck four-wheel format. Other wheel/tire geometries are possible, such as those including six or more wheels. Any combination of the wheels/tires 121 of the vehicle 100 may be configured to rotate differentially with respect to other wheels/tires 121. The wheels/tires 121 could represent at least one wheel that is attached to the transmission 120 and at least one tire coupled to a rim of a wheel that could make contact with a driving surface. The wheels/tires 121 could include any combination of metal and rubber, or another combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., an $O_2$ monitor, a fuel gauge, or an engine oil pressure gauge). Other sensors are possible as well.

One or more of the sensors included in the sensor system 104 could be configured to be actuated separately and/or collectively in order to modify a position and/or an orientation of the one or more sensors.

The Global Positioning System (GPS) 122 may be any sensor configured to determine a location of the vehicle 100. To this end, the GPS 122 could include a transceiver configured to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the environment of the vehicle 100. In some embodiments, in addition to sensing the objects, the RADAR unit 126 may additionally be configured to sense the speed and/or direction of motion of the objects.

Similarly, the laser rangefinder/LIDAR unit 128 may be any sensor configured to sense objects in the environment of the vehicle 100 by using lasers. In an example embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be configured to captures still frames and/or continuous video.

The control system 106 may be configured to control operation of the vehicle 100 and its components. Accordingly, the control system 106 could include various elements including a steering unit 132, a throttle 134, a brake unit 136, a sensor fusion algorithm 138, a computer vision system 140, a navigation and pathing system 142, and an obstacle avoidance system 144.

The steering unit 132 could represent any combination of mechanisms that may be configured to adjust a direction of motion of the vehicle 100. For example, a steering wheel or steering column may be mechanically coupled to the wheels/tires 121 and turning the steering wheel or steering column may cause the wheels/tires 121 to change the direction of motion of the vehicle 100.

The throttle 134 could be configured to control, for instance, the operating speed of the engine/motor 118 and, in turn, control the speed of the vehicle 100. For example, the throttle 134 may be configured to increase or decrease a rate of energy conversion of the energy source 119 that is converted to mechanical energy by the engine/motor 118.

The brake unit 136 could include any combination of mechanisms configured to decelerate the vehicle 100. The brake unit 136 could use disc or drum brakes that use friction to slow rotation of the wheels/tires 121. In other embodiments, the brake unit 136 could convert kinetic energy of the wheels/tires 121 to electric current. The brake unit 136 may take other forms as well.

The sensor fusion algorithm 138 may be an algorithm configured to accept data from the sensor system 104 as an input. (The sensor fusion algorithm 138 may be data representing the sensor fusion algorithm stored in the data storage 114.) The input data may include, for example, data representing information sensed by the sensors of the sensor system 104. The sensor fusion algorithm 138 could include, for instance, a Kalman filter, a Bayesian network, or another algorithm. The sensor fusion algorithm 138 could further provide various assessments based on the data from the sensor system 104. In an example embodiment, the assessments could include evaluations of individual objects and/or features in the environment of vehicle 100, an evaluation of a particular situation, or evaluations of possible impacts based on the particular situation. Other assessments are possible.

The computer vision system 140 may be any system configured to process and analyze images captured by the camera 130 in order to identify objects or features in the environment of vehicle 100, including traffic signals, roadway boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, or estimate the speed of objects.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to receive input data or provide outputs, including to or from external sensors, other vehicles, and other computer systems. For example, peripherals 108 could include a wireless communication system 146, a touchscreen 148, a microphone 150, and a speaker 152.

In one example, the wireless communication system 146 could be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE.

Alternatively, the wireless communication system 146 could communicate with a wireless local area network (WLAN), for example, using WiFi. In some embodiments, the wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

In an example embodiment, the touchscreen 148 may be configured to display information, including information describing a state of the vehicle 100. The input/output interface 116 could also be configured to accept input from the touchscreen 148. The touchscreen 148 may be configured to sense a position and/or a movement of a finger via capacitive sensing, resistance sensing, or a surface acoustic wave process, among other possibilities. The touchscreen 148 may be capable of sensing finger movement in a direction parallel or planar to the touchscreen surface, or in a direction normal to the touchscreen surface, and may also be capable of sensing a level of pressure applied to the surface of the touchscreen 148. The touchscreen 148 may be formed of one or more translucent or transparent insulating layers and one or more translucent or transparent conducting layers. The touchscreen 148 may take other forms as well.

The microphone 150 may be configured to detect sound waves (e.g., a voice command) and convert the sound waves into audio signals for use by the computer system 112. Similarly, the speakers 152 may be configured to receive audio signals and convert the audio signals into sound waves.

The power supply 110 may provide power to various components of the vehicle 100 and could represent, for example, a rechargeable lithium-ion or lead-acid battery. In some embodiments, one or more banks of such batteries could be configured to provide electrical power to the vehicle 100. Other power supply components and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes the instructions 115 stored in a non-transitory computer readable medium, such as the data storage 114. The computer system 112 may also represent a plurality of processors or computing devices that may serve to control individual components or subsystems of the vehicle 100 in a distributed fashion.

In some embodiments, the data storage 114 may contain the instructions 115 (e.g., program logic) executable by the processor 113 to execute various functions of vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The computer system 112 may control the function of the vehicle 100 based on inputs received from various subsystems (e.g., the propulsion system 102, the sensor system 104, and the control system 106), as well as from the input/output interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be configured to provide control over many aspects of the vehicle 100 and its subsystems.

The vehicle 100 may include an input/output interface 116 for providing information for output or receiving input from the peripherals 108. The input/output interface 116 could control or enable control of content and/or a layout of interactive images that could be displayed on the touchscreen 148. Further, the input/output interface 116 could include one or more input/output devices within the set of peripherals 108, such as the wireless communication system 146, the touchscreen 148, the microphone 150, and the speaker 152.

Although FIG. 1 shows various components of the vehicle 100, i.e., the wireless communication system 146, the computer system 112, the data storage 114, and the input/output interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
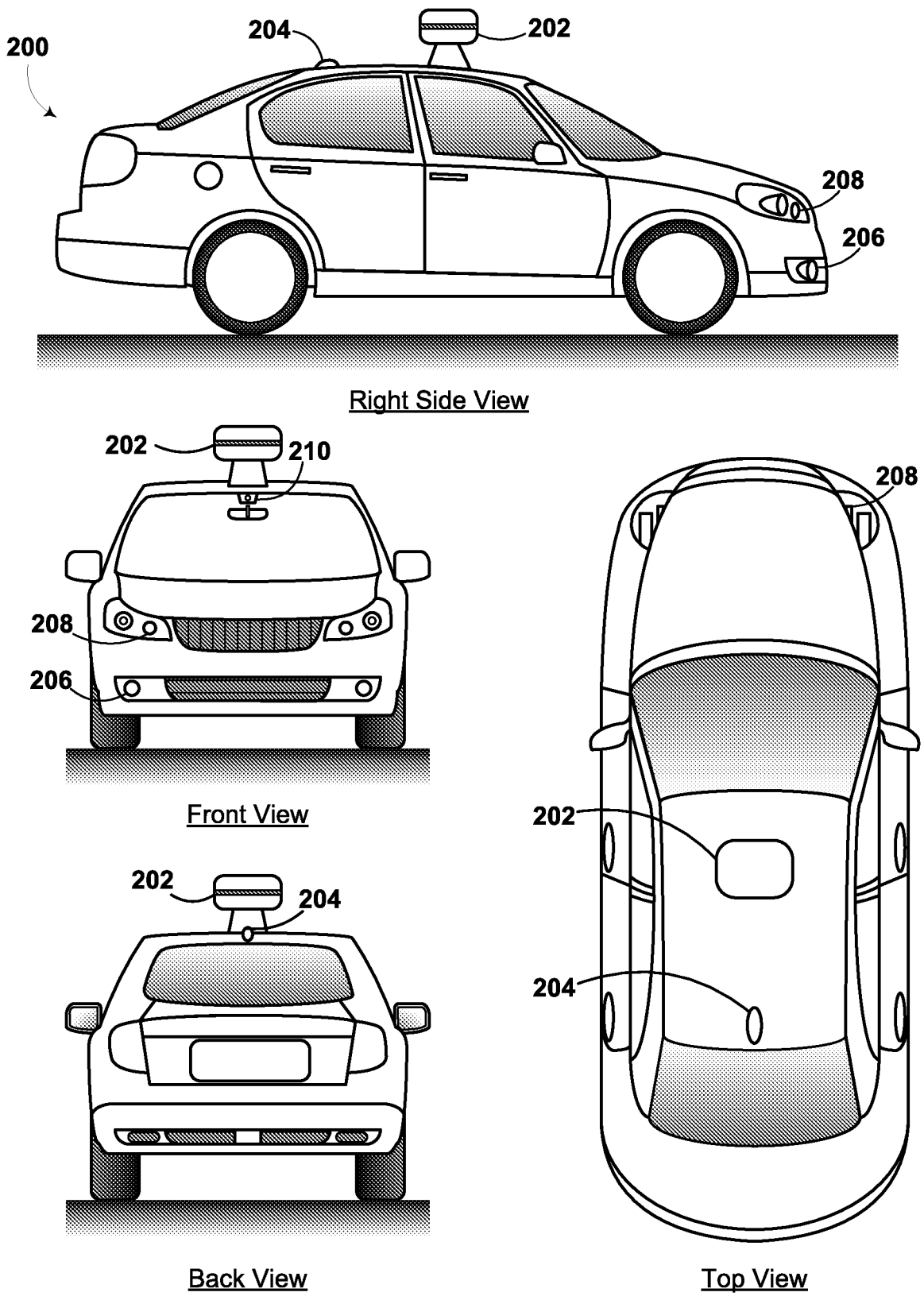
FIG. 2 depicts an example vehicle.

FIG. 2 depicts an example vehicle 200 that could be similar to the vehicle 100 described in FIG. 1. Although the vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, the vehicle 200 could include a sensor unit 202, a wireless communication system 204, a LIDAR unit 206, a laser rangefinder unit 208, and a camera 210. The elements of the vehicle 200 could include some or all of the elements described as part of the vehicle 100, depicted in FIG. 1.

The sensor unit 202 could include one or more different sensors configured to capture information about an environment of the vehicle 200. For example, the sensor unit 202 could include any combination of cameras, RADARs, LIDARs, range finders, and acoustic sensors. Other types of sensors are possible. In an example embodiment, the sensor unit 202 could include one or more movable mounts that could be configured to adjust the orientation of one or more sensors in the sensor unit 202. In one embodiment, the movable mount could include a rotating platform that could scan sensors so as to obtain information from many directions around the vehicle 200. In another embodiment, the movable mount of the sensor unit 202 could be moveable in a scanning fashion within a particular range of angles and/or azimuths. The sensor unit 202 could be mounted atop a roof of the vehicle 200, for instance, however other mounting locations are possible. Additionally, the sensors of the sensor unit 202 could be distributed in different locations and need not be in a single location. Some possible sensor types and mounting locations include the LIDAR unit 206 and the laser rangefinder unit 208, as depicted in FIG. 2. Furthermore, each sensor of the sensor unit 202 could be configured to be moved or scanned independently of other sensors of the sensor unit 202. In one example, the sensor unit 202 may be enclosed within an a (e.g., plastic) casing that allows at least some light to pass through the casing.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of an electromagnetic spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern from the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 may use the camera 210 to detect a reflection of the laser from various points of the object. Based on a length of time it takes the laser to reflect from the object at various points, the vehicle 200 may determine the distance to the points on the object. As yet another example, the camera 210 may use a time-of-flight technique in which the vehicle 200 emits a light pulse and uses the camera 210 to detect a reflection of the light pulse from an object at a number of points on the object. In particular, the camera 210 may include a number of pixels, and respective pixels may detect the reflection of the light pulse from a point on the object. Based on a length of time it takes the light pulse to reflect from the object at various points, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated in FIG. 2, the camera 210 could capture images from a forward-looking view with respect to the vehicle 200. Other mounting locations and viewing angles of camera 210 are possible, either inside or outside the vehicle 200.

The camera 210 could have associated optics that could be configured to provide an adjustable field of view. Further, the camera 210 could be mounted to vehicle 200 with a movable mount that could be configured to vary a pointing angle of the camera 210.

The brushless axial-flux motor may have many uses, some examples of which are described below. Either of the example vehicles respectively depicted in FIG. 1 and FIG. 2 could include a brushless axial-flux motor configured to provide a locomotive force for the vehicle. For example, a printed circuit board (PCB) serving as a motor stator may be coupled to wheels/tires 121 of FIG. 1. The wheels/tires 121 could include a wheel hub and the PCB may be coupled to the wheel hub, the wheel hub possibly being further coupled to a support frame of the vehicle. The motor may include one or more rotors movably coupled via an axle or other attachment means to the PCB, the wheel hub, and/or the support frame. Magnets may be attached to the one or more rotors so that providing current to various conductive paths of the PCB may cause, via induction, the one or more rotors to rotate with respect to the PCB. As the one or more rotors rotate, the locomotive force may be applied via wheels/tires 121 to the driving surface.

In another example, the brushless axial-flux motor may rotate a laser scanner (e.g., a scanning head) of the laser rangefinder/LIDAR unit 128 of the vehicle 100. For instance, the brushless axial-flux motor may be mechanically coupled to a shaft that is further mechanically coupled to a reflector (e.g., a mirror). A laser may illuminate the reflector with a light beam, and the brushless axial-flux motor may rotate the reflector to redirect the light beam in various directions for remote sensing purposes. For example, as the brushless axial-flux motor makes a full 360-degree rotation, the laser scanner may similarly redirect or scan the light beam about 360-degrees of rotation.

In yet another example, the brushless axial-flux motor may rotate one or more wipers of the sensor unit 202 of the vehicle 200. The sensor unit 202 may house one or more sensors of the vehicle 200, such as the laser rangefinder/LIDAR unit 128, the camera 130, etc. For instance, the sensor unit 202 may be mounted on a top exterior surface of the vehicle 200 and be enclosed within an at least partially transparent casing (e.g., a plastic casing). During operation of the vehicle 200, an exterior surface of the casing may become coated with mud, dust, or similar opaque contaminants. The brushless axial-flux motor may be mechanically coupled to the one or more wipers, and cause the one or more wipers to move across the exterior surface of the casing, thereby removing the contaminants from at least a portion of the transparent casing. Removing the contaminants in such a manner may allow light-sensitive sensors such as the laser rangefinder/LIDAR unit 128 or the camera 130 to detect and/or transmit light through the casing.

Figure 3A:
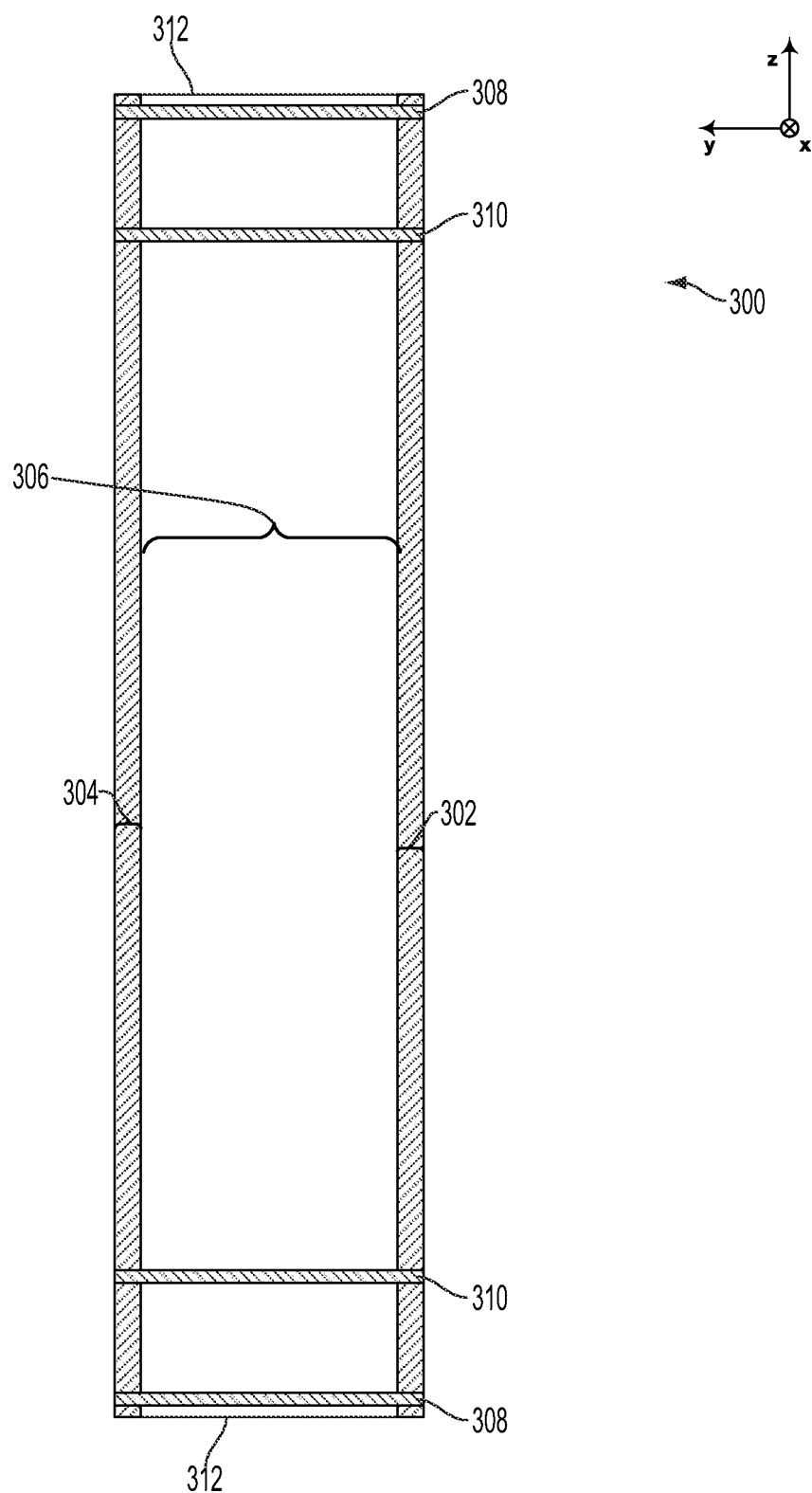
FIG. 3A illustrates a cross section of an example printed circuit board.

FIG. 3A illustrates a cross section of a printed circuit board (PCB). FIG. 3A includes the printed circuit board (PCB) 300, a first conductive layer 302, a second conductive layer 304, an insulating layer 306, a first plurality of conductive vias 308, a second plurality of conductive vias 310, and an outer edge 312.

The first conductive layer 302 may be a layer of copper or other conductive material that is adhesively coupled to the insulating layer 306 and is patterned or etched to form various conductive paths or areas for current flow. For instance, the first conductive layer 302 may be a metal sheet that has been etched via various techniques. The pattern(s) or conductive paths formed within the first conductive layer 302 may be determined by a pattern of a protective mask (not shown) that is applied to the first conductive layer 302 during etching. The pattern of the protective mask may determine the pattern of the first conductive layer 302 in that etching may dissolve and/or remove portions of the first conductive layer 302 that are not covered by the protective mask during etching and may leave other areas of the conductive layer 302 intact that are covered by the protective mask during etching.

The second conductive layer 304 may be similar to the first conductive layer 302. For example, the second conductive layer 304 may be patterned in the same way as the first conductive layer 302 and may be adhesively coupled to the insulating layer 306 opposite the first conductive layer 302. The second conductive layer 304 may be electrically coupled to the first conductive layer 302 at various locations by the first plurality of conductive vias 308 located at an outer radius of the PCB or the second plurality of conductive vias 310 located at an inner radius of the PCB.

The insulating layer 306 may be made from any material suitable for providing electrical insulation between at least portions of the first conductive layer 302 and at least portions of the second conductive layer 304. The insulating layer 306 may be adhesively coupled to the first conductive layer 302 and the second conductive layer 304 and located between the first conductive layer 302 and the second conductive layer 304.

The first plurality of conductive vias 308 may be located near an outer edge 312 of the PCB 300 and pass through the insulating layer 306 at an outer radius of the PCB 300 to electrically couple at least a portion of the first conductive layer 302 to at least a portion of the second conductive layer 304.

The second plurality of conductive vias 310 may be located radially inward from the first plurality of conductive vias 308 and pass through the insulating layer 306 at an inner radius of the PCB 300 to electrically couple at least a portion of the first conductive layer 302 to at least a portion of the second conductive layer 304.

Figure 3B:
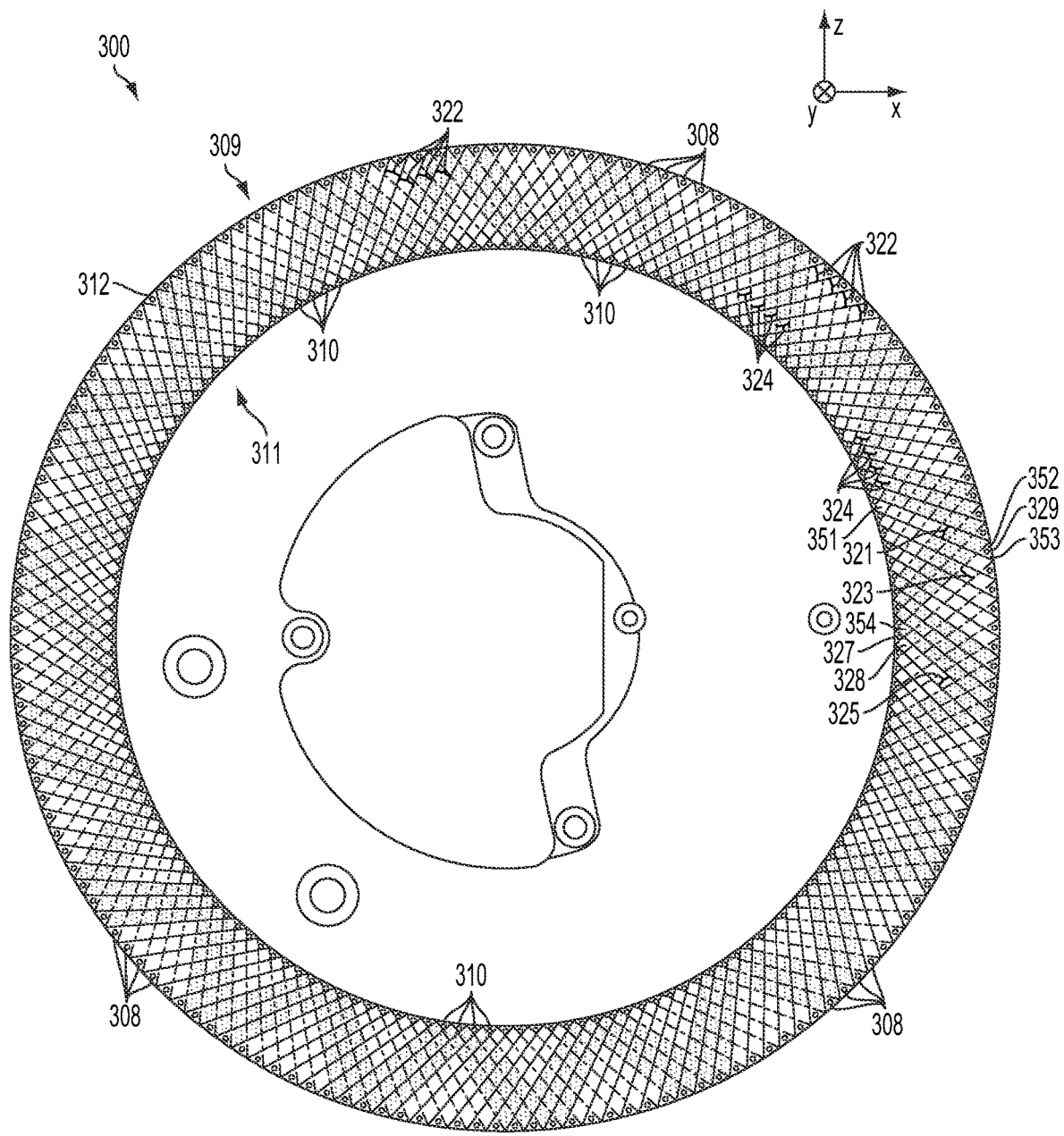
FIG. 3B illustrates a side view of the example printed circuit board of FIG. 3A.

FIG. 3B illustrates a side view of the printed circuit board (PCB) 300 of FIG. 3A. FIG. 3B includes a first plurality of conductive vias 308 located on an outer radius 309 of the PCB 300 and a second plurality of conductive vias 310 located on an inner radius 311 of the PCB 300. As shown in FIG. 3B, the first conductive layer 302 of FIG. 3A includes a first plurality of conductive paths 322 (separated by solid lines) and the second conductive layer 304 of FIG. 3A includes a second plurality of conductive paths 324 (separated by dashed lines).

The first plurality of conductive paths 322 may respectively have first ends at the inner radius 311 and second ends at the outer radius 309. For example, current may flow through a conductive path 321 of the first plurality of conductive paths 322, travelling from a first end 351 of the conductive path 321 at the inner radius 311 to a second end 352 of the conductive path 321 at the outer radius 309, thereby travelling in a clockwise direction around a circumference of the PCB 300 and also in a radially outward direction, as depicted in FIG. 3B.

The second plurality of conductive paths 324 may respectively have first ends at the outer radius 309 and second ends at the inner radius 311. For example, current may flow through a conductive path 323 of the second plurality of conductive paths 324, travelling from a first end 353 of the conductive path 323 at the outer radius 309 to a second end 354 of the conductive path 323 at the inner radius 311, thereby travelling in a clockwise direction around a circumference of the PCB 300 and also in a radially inward direction, as viewed in FIG. 3B.

By further example, the conductive path 321 of the first plurality of conductive paths 322 may be electrically coupled to the conductive path 323 of the second plurality of conductive paths 324 by a conductive via 329 of the first plurality of conductive vias 308. The conductive via 329 may be located at the second end 352 of the conductive path 321 (i.e. the first end 353 of the conductive path 323). The conductive path 323 may be electrically coupled to a conductive path 325 of the first plurality of conductive paths 322 by a conductive via 327 of the second plurality of conductive vias 310. The conductive via 327 may be located at a second end 354 of the conductive path 323 (i.e. the first end 328 of the conductive path 325). In this way, current may travel through conductive paths back and forth between the inner radius 311 and the outer radius 309, and also back and forth between the first conductive layer 302 (see FIG. 3A) and the second conductive layer 304 (see FIG. 3A) so that the PCB 300 includes several conductive paths that make substantially complete revolutions around a circumference of the PCB 300. As current travels around the circumference of the PCB 300, the current may also repeatedly make revolutions around an annular portion of the PCB 300 as the current alternates traveling within the first conductive layer 302 and the second conductive layer 304 (see FIG. 3A).

Although FIG. 3B depicts the PCB 300 having a circular shape with the first plurality of conductive paths 322 and the second plurality of conductive paths 324 located within an annular area bounded by the inner radius 311 and the outer radius 309, other examples are possible. For instance, an area that includes conductive paths could be bounded by a perimeter of an N-sided polygon and a perimeter of an M-sided polygon, the N-sided polygon and the M-sided polygon having a common center. So, in one aspect, the inner radius 311 could be the perimeter of the N-sided polygon and the outer radius 309 could be the perimeter of the M-sided polygon, with an area bounded by the perimeter of the M-sided polygon being larger than an area bounded by the perimeter of the N-sided polygon. In some examples, M could be equal to N but in other examples M may be unequal to N. In this way, the inner radius 311 and the outer radius 309 may respectfully include a perimeter of any bounded region.

Figure 4:
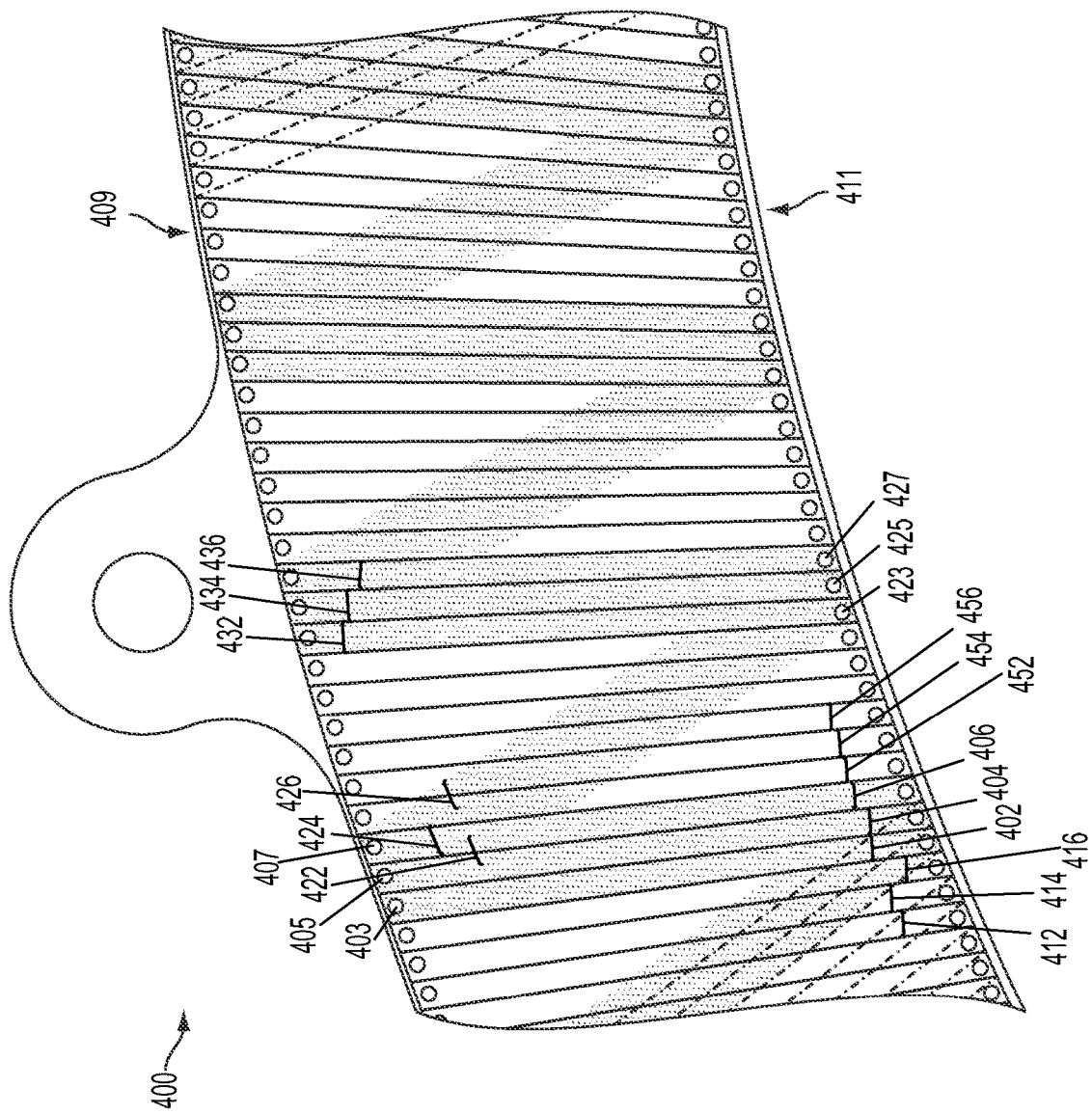
FIG. 4 illustrates a portion of another example printed circuit board.

FIG. 4 illustrates a portion of a printed circuit board (PCB) 400, including conductive paths 402, 404, 406, 412, 414, 416, 422, 424, 426, 432, 434, 436, 452, 454, and 456, conductive vias 403, 405, 407, 423, 425, and 427, an outer radius 409, and an inner radius 411.

The conductive paths 402, 404, 406, 412, 414, 416, 452, 454, 456, 432, 434, and 436 may be included within a first conductive layer of the PCB 400, whereas the conductive paths 422, 424, and 426 may be included within a second conductive layer of the PCB 400.

The conductive paths 402, 404, and 406 may be a first set of conductive paths that belong to a first phase winding of a multi-phase brushless motor and may be included on a first (front as shown) conductive layer of the PCB 400. For instance, a first phase current may be passed through the conductive path 402 toward the outer radius 409, through the conductive via 403 to a second (back as shown) conductive layer of the PCB 400, through the conductive path 422 toward the inner radius 411, through the conductive via 423 back to the first conductive layer, and back toward the outer radius 409 through the conductive path 432. In this way, a first composite conductive path may comprise the conductive path 402, the conductive via 403, the conductive path 422, the conductive via 423, and the conductive path 432. The first composite conductive path may make (i) a substantially complete revolution around a circumference of the PCB 400, (ii) repeated travels back and forth between the inner radius 411 and the outer radius 409, and (iii) repeated revolutions around an annular portion of the PCB 400 defined by the inner radius 411 and the outer radius 409.

After making a substantially complete revolution around a circumference of the PCB 400, the first composite path may be electrically coupled in series with a second composite path that includes the conductive path 404, the conductive via 405, the conductive path 424, the conductive via 425, and the conductive path 434. (FIG. 5 includes more details regarding the series connection between the first composite path and the second composite path.)

Similarly, after making a substantially complete revolution around a circumference of the PCB 400, the second composite path may be electrically coupled in series with a third composite path that includes the conductive path 406, the conductive via 407, the conductive path 426, the conductive via 427, and the conductive path 436. In this way, a conductive path that includes the first, second, and third composite paths may make three (or more) substantially complete revolutions around the circumference of the PCB 400.

In another aspect, the conductive paths 402, 404, and 406 may form a first set of conductive paths that are substantially mutually parallel. The conductive path 404 may be located between and adjacent to both the conductive path 402 and the conductive path 406. The first set of conductive paths may represent a portion of a first phase winding of a multi-phase brushless motor. Other corresponding sets of conductive paths, such as the conductive paths 422, 424, and 426 and the conductive paths 432, 434, and 436 may also represent a portion of the first phase winding.

A second phase winding of the PCB 400 may include a second set of conductive paths 412, 414, and 416. As shown in FIG. 4, the conductive path 416 may be adjacent to the conductive path 402 of the first set of conductive paths. A third phase winding of the PCB 400 may include a third set of conductive paths 452, 454, and 456. As shown in FIG. 4, the conductive path 452 may be adjacent to the conductive path 406 of the first set of conductive paths.

The first, second, and third phase windings may be configured to interact with at least one magnet of one or more rotors of the multi-phase brushless motor to induce rotational motion of the one or more rotors relative to the PCB 400. For example, a first phase current may be carried by the conductive paths 402, 404, and 406, which respectively represent series windings of the first phase winding. The first phase current may induce a periodic magnetic field that periodically attracts or repels various magnets of the rotor. Also, a second phase current may be carried by the conductive paths 412, 414, and 416, and a third phase current may be carried by the conductive paths 452, 454, and 456. This may cause magnets of the rotor to be periodically and/or sequentially attracted to or repelled from the conductive paths respectively making up the first phase winding, the second phase winding, and the third phase winding. This may cause rotational motion of the rotor.

Figure 5:
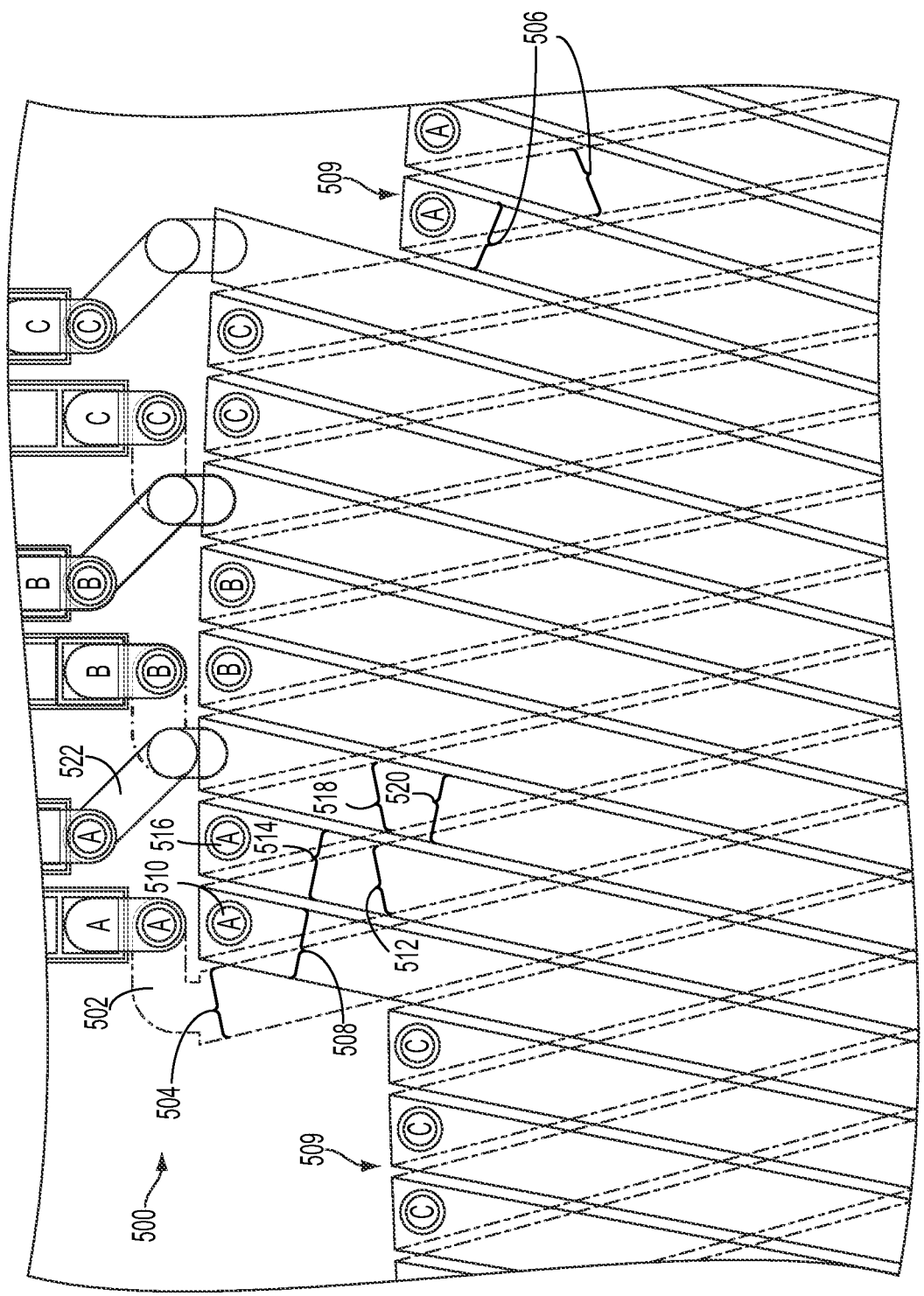
FIG. 5 illustrates a termination area of an example printed circuit board.

FIG. 5 illustrates a termination area of a printed circuit board (PCB) 500. FIG. 5 includes a positive terminal 502, a first conductive path 504, a composite path 506, a second conductive path 508, an outer radius 509, a first conductive via 510, a third conductive path 512, a fourth conductive path 514, a second conductive via 516, a fifth conductive path 518, a sixth conductive path 520, and a negative terminal 522.

The positive terminal 502 may represent a point where a positive terminal of a power supply is electrically coupled to the first conductive path 504. The positive terminal 502 may include a soldered connection between the positive terminal of the power supply and the first conductive path 504, but other electrical connections are possible.

The first conductive path 504 may be located on a second (back) conductive layer of the PCB 500 and may extend radially outward from the outer radius 509. Current may travel from the positive terminal 502 toward an inner radius (not shown) of the PCB 500 through the first conductive path 504. The first conductive path 504 may be electrically coupled to the composite path 506 by a conductive via located on the inner radius (not shown).

The composite path 506 may include several conductive vias for current to travel back and forth between the first (front) conductive layer and the second (back) conductive layer of the PCB 500 and several conductive paths that travel back and forth between the inner radius of the PCB 500 and the outer radius 509 of the PCB 500. (See FIG. 3B or FIG. 4 for more details.) The composite path 506 may make a substantially complete revolution around a circumference of the PCB 500 to be electrically coupled to the second conductive path 508 by a conductive via at the inner radius (not shown).

The second conductive path 508 may be located on a first (front) conductive layer of the PCB 500 and may extend radially outward from the outer radius 509. Current may travel from the inner radius through the second conductive path 508 toward the first conductive via 510. The second conductive path 508 may be electrically coupled to the third conductive path 512 by the first conductive via 510 located radially outward of the outer radius 509.

The third conductive path 512 may be located on a second (back) conductive layer of the PCB 500 and may extend radially outward from the outer radius 509. Current may travel from the conductive via 510 through the third conductive path 512 toward the inner radius (not shown). The third conductive path 512 may be electrically coupled, by a via at the inner radius, to another composite path that makes a substantially complete revolution around a circumference of the PCB 500 and electrically couples to the fourth conductive path 514 through a via located on the inner radius (not shown).

The fourth conductive path 514 may be located on a first (front) conductive layer of the PCB 500 and may extend radially outward from the outer radius 509. Current may travel from the inner radius (not shown) through the fourth conductive path 514 toward the second conductive via 516 located radially outward of the outer radius 509. The second conductive via 516 may electrically couple the fourth conductive path 514 to the fifth conductive path 518.

The fifth conductive path 518 may be located on a second (back) conductive layer of the PCB 500 and may extend radially outward from the outer radius 509. Current may travel from the second conductive via 516 through the fifth conductive path 518 toward the inner radius (not shown). The fifth conductive path 518 may be electrically coupled, by a via at the inner radius, to yet another composite path that makes a substantially complete revolution around a circumference of the PCB 500 and electrically couples to the sixth conductive path 520 through a via at the inner radius.

The sixth conductive path 520 may be located on a first (front) conductive layer of the PCB 500 and may extend radially outward from the outer radius 509. Current may travel from the inner radius (not shown) through the sixth conductive path 520 toward the negative terminal 522 located radially outward of the outer radius 509. The negative terminal 522 may electrically couple the sixth conductive path 520 to a negative terminal of a power supply. The negative terminal 522 may include a soldered connection, but other electrical connections are possible.

In this way, current provided from a given phase of a multi-phase power source may (i) flow through the first conductive path 504 via the positive terminal 502, (ii) make a first substantially complete revolution around the circumference of the PCB 500 along the composite path 506, (iii) flow through the second conductive path 508, (iv) flow through the first conductive via 510, (v) flow through the third conductive path 512, (vi) make second a substantially complete revolution around the circumference of the PCB 500 along another composite path, (vii) flow through the fourth conductive path 514, (viii) flow through the second conductive via 516, (ix) flow through the fifth conductive path 518, (x) make a third substantially complete revolution around the circumference of the PCB 500 along yet another composite path, and (xi) flow through the sixth conductive path 520 toward the negative terminal 522.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A printed circuit board (PCB) of a multi-phase brushless motor, the PCB comprising:
   a first conductive layer comprising a first plurality of conductive paths having first layer inner-radius ends at an inner radius of the PCB and first layer outer-radius ends at an outer radius of the PCB, wherein the outer radius surrounds the inner radius;
   a second conductive layer comprising a second plurality of conductive paths having second layer outer-radius ends at an outer radius of the PCB and second layer inner-radius ends at an inner radius of the PCB;
   a first plurality of conductive vias that pass through the PCB at the outer radius of the PCB and electrically couple the first layer outer-radius ends to the second layer outer-radius ends; and
   a second plurality of conductive vias that pass through the PCB at the inner radius of the PCB and electrically couple the second layer inner-radius ends to the first layer inner-radius ends.

2. The PCB of claim 1, wherein the first plurality of conductive paths comprise a set of conductive paths, wherein the conductive paths of the set belong to a phase winding of the multi-phase brushless motor.

3. The PCB of claim 2, wherein the conductive paths of the set are mutually substantially parallel.

4. The PCB of claim 2, wherein the set of conductive paths is a first set and the phase winding is a first phase winding, the PCB further comprising:
   a second set of conductive paths belonging to a second phase winding of the multi-phase brushless motor, wherein a conductive path of the second set is adjacent to a conductive path of the first set; and
   a third set of conductive paths belonging to a third phase winding of the multi-phase brushless motor, wherein a conductive path of the third set is adjacent to a conductive path of the first set.

5. The PCB of claim 1, wherein the PCB comprises a group of conductive paths configured to have current flow through the conductive paths of the group to produce a magnetic field to induce rotational motion of the multi-phase brushless motor.

6. The PCB of claim 1, further comprising a composite conductive path that completes a revolution around an annular portion of the PCB defined by the inner radius and the outer radius.

7. The PCB of claim 1, further comprising a composite conductive path that travels back and forth between the inner radius and the outer radius.

8. The PCB of claim 1, further comprising a composite conductive path comprising a conductive path on the first conductive layer, a conductive path on the second conductive layer, a conductive via of the first plurality of vias, and a conductive via of the second plurality of vias.

9. A vehicle comprising:
   a scanner of a Light Detection and Ranging (LIDAR) system, wherein the scanner is configured to direct, over a range of directions, a light beam generated by the LIDAR system; and
   a printed circuit board (PCB) of a multi-phase brushless motor coupled to the scanner, wherein the multi-phase brushless motor is configured to rotate the scanner thereby changing the direction of the light beam, and wherein the PCB further comprises:
   a first conductive layer comprising a first plurality of conductive paths having first layer inner-radius ends at an inner radius of the PCB and first layer outer-radius ends at an outer radius of the PCB, wherein the outer radius surrounds the inner radius;
   a second conductive layer comprising a second plurality of conductive paths having second layer outer-radius ends at an outer radius of the PCB and second layer inner-radius ends at an inner radius of the PCB;
   a first plurality of conductive vias that pass through the PCB at the outer radius of the PCB and electrically couple the first layer outer-radius ends to the second layer outer-radius ends; and a second plurality of conductive vias that pass through the PCB at the inner radius of the PCB and electrically couple the second layer inner-radius ends to the first layer inner-radius ends.

10. The vehicle of claim 9, wherein the first plurality of conductive paths comprise a set of conductive paths, wherein the conductive paths of the set belong to a phase winding of the multi-phase brushless motor.

11. The vehicle of claim 10, wherein the conductive paths of the set are mutually substantially parallel.

12. The vehicle of claim 10, wherein the set of conductive paths is a first set and the phase winding is a first phase winding, the PCB further comprising:
- a second set of conductive paths belonging to a second phase winding of the multi-phase brushless motor, wherein a conductive path of the second set is adjacent to a conductive path of the first set; and
- a third set of conductive paths belonging to a third phase winding of the multi-phase brushless motor, wherein a conductive path of the third set is adjacent to a conductive path of the first set.

13. The vehicle of claim 9, wherein the PCB comprises a group of conductive paths configured to have current flow through the conductive paths of the group to produce a magnetic field to induce rotational motion of the multi-phase brushless motor.

14. The vehicle of claim 9, further comprising a composite conductive path that completes a revolution around an annular portion of the PCB defined by the inner radius and the outer radius.

15. The vehicle of claim 9, further comprising a composite conductive path that travels back and forth between the inner radius and the outer radius.

16. The vehicle of claim 9, further comprising a composite conductive path comprising a conductive path on the first conductive layer, a conductive path on the second conductive layer, a conductive via of the first plurality of vias, and a conductive via of the second plurality of vias.

17. A printed circuit board (PCB) of a multi-phase brushless motor, the PCB comprising:
- a first conductive layer disposed on a first side of the PCB, the first conductive layer comprising a first plurality of conductive paths having first layer inner-radius ends at an inner radius of the PCB and first layer outer-radius ends at an outer radius of the PCB, wherein the outer radius surrounds the inner radius;
- a second conductive layer disposed on a second side of the PCB that is opposite the first side of the PCB, the second conductive layer comprising a second plurality of conductive paths having second layer outer-radius ends at an outer radius of the PCB and second layer inner-radius ends at an inner radius of the PCB;
- a first plurality of conductive vias that pass through the PCB at the outer radius of the PCB and electrically couple the first layer outer-radius ends to the second layer outer-radius ends; and
- a second plurality of conductive vias that pass through the PCB at the inner radius of the PCB and electrically couple the second layer inner-radius ends to the first layer inner-radius ends.

18. The PCB of claim 17, wherein the first plurality of conductive paths comprise a set of conductive paths, wherein the conductive paths of the set belong to a phase winding of the multi-phase brushless motor.

19. The PCB of claim 18, wherein the conductive paths of the set are mutually substantially parallel.

20. The PCB of claim 18, wherein the set of conductive paths is a first set and the phase winding is a first phase winding, the PCB further comprising:
- a second set of conductive paths belonging to a second phase winding of the multi-phase brushless motor, wherein a conductive path of the second set is adjacent to a conductive path of the first set; and
- a third set of conductive paths belonging to a third phase winding of the multi-phase brushless motor, wherein a conductive path of the third set is adjacent to a conductive path of the first set.

* * * * *